United States Patent [19]
White et al.

[11] Patent Number: 5,581,468
[45] Date of Patent: Dec. 3, 1996

[54] SYSTEM AND METHOD FOR MODELING PLASTIC MOLDING AND MOLDING PARTS INCORPORATING THE SAME

[75] Inventors: Warren D. White; Muhammad A. Shafi, both of Lake Jackson, Tex.; L. James Lee, Dublin; Kerang Han, Columbus, both of Ohio

[73] Assignee: The Dow Chemical Co., Midland, Mich.

[21] Appl. No.: 371,199

[22] Filed: Jan. 11, 1995

[51] Int. Cl.[6] .......................... G06F 19/00; G06G 7/64; G06G 7/66
[52] U.S. Cl. ........................................... 364/475.09
[58] Field of Search .................... 364/476, 477

[56] References Cited

U.S. PATENT DOCUMENTS

| | | | |
|---|---|---|---|
| 4,534,003 | 8/1985 | Manzione | 364/476 |
| 4,809,202 | 2/1989 | Wolfram | 364/578 |
| 4,989,166 | 1/1991 | Akasaka et al. | 364/578 |
| 5,031,108 | 7/1991 | Fujita et al. | 364/476 |
| 5,031,127 | 7/1991 | Fujita et al. | 364/476 |
| 5,097,431 | 3/1992 | Harada et al. | 364/578 |
| 5,097,432 | 3/1992 | Harada et al. | 364/578 |
| 5,227,979 | 7/1993 | Fukuhira et al. | . |
| 5,377,119 | 12/1994 | Backer et al. | . |
| 5,402,366 | 3/1995 | Kihara et al. | . |

OTHER PUBLICATIONS

"Flow Simulation in Molds with Preplaced Fiber Mats", Young et al., Polymer Composites, Dec. 1991, No. 6 p. 391–403.

"Flow Simulation in Molds With Preplaced Fiber Mats", Young et al, Report No. ERC/NSM—p. 10–20, NSF Engineering Research Center for Net Shape Manufacturing, Ohio State University.

"Flow Simulation in Molds with Preplaced Fiber Mats", Young, et al, Polymer Composites, Dec. 1991, vol. 12, No. 6, pp. 391–403.

"Mold Filling Similation in Molds With Preplaced Fiber Mats", Young, et al, Report No. ERC/NSM–P–90–20, NSF Engineering Research Center for Net Shape Mfg., Ohio State Univ., Columbus, OH 43210, Jun., 1990.

Primary Examiner—Roy N. Envall, Jr.
Assistant Examiner—Karen D. Presley
Attorney, Agent, or Firm—Brooks & Kushman P.C.

[57] ABSTRACT

A system and method for simulating LCM mold filling utilizes at least one processor, suitable RAM and storage memory, input means, display means, and logic for simulating the injection of resin into a mold cavity containing a preform based upon mold cavity design parameters, mold filling processing parameters, physical property parameters, and system processing parameters, and identifying the current state of selected mold filling conditions at selected points in time during the simulated mold filling process. The system includes logic for identifying incipient dry spots, and also preferably includes means for interrupting the operation of the program at selected points to vary selected parameters to eliminate incipient dry spots and otherwise maximize the mold filling process. The system may additionally include logic for determining whether the output from a mold filling simulation satisfies a set of predefined criteria to determine whether a particular mold design and/or filling process is acceptable for use in production and, if so, record the approved mold filling process parameters for transfer and input to an RTM mold control. Alternatively, the system may be incorporated into a conventional mold control for direct input of developed mold filling process parameters into the control for use in operating the mold to produce liquid composite plastic parts.

14 Claims, 9 Drawing Sheets

SYSTEM AND METHOD FOR MODELING PLASTIC MOLDING AND MOLDING PARTS INCORPORATING THE SAME

TECHNICAL FIELD

The present invention relates to systems for designing molds, molding netshape parts, and modeling the resin transfer molding (RTM) process.

BACKGROUND ART

Resin transfer molding (RTM) has been used to manufacture netshape parts for a wide range of industries ranging from aerospace to automobile. In its most basic form, a fiber mat is cut, shaped, and/or stamped into a preform which is placed in a mold cavity. After the mold is closed and clamped, a resin is injected into the cavity. As the resin flows through the preform, it expels the air and wets the preform. When the cavity has been filled, the temperature of the mold is increased and the resin starts curing. The part is removed from the mold after the resin has cured.

It will be appreciated that, while the present invention and much of the following discussion relates specifically to RTM, the invention has equal utility with other forms of liquid composite molding (LCM). As used herein, LCM is intended to refer to any molding process where a formable material flows through a porous media, and where the flow of the formable material can be represented by mathematical equations of the type disclosed herein.

The structural requirements often dictate that the molded parts should not contain incompletely filled areas, or so-called dry spots. A dry spot can appear either because of air entrapment, use of low feed pressure, or both, or the like.

Dry spots are usually formed in an LCM part when some of the air in the mold is trapped in an area of the cavity from where it cannot escape through an open vent. Areas of the mold where air is trapped unconnected to an open vent during the mold filling process (or simulation thereof) may also be referred to herein as an incipient dry spot. The trapped air may or may not ultimately escape through an open vent during the filling process, depending upon the gas pressure in the incipient dry spot and the resin pressure in the immediate neighborhood of the dry spot.

It will thus be understood that, for the purposes of this discussion, unless referenced in connection with a finished part, all references to "incipient dry spot" or "dry spot" are used interchangeably to mean an incompletely filled area in the flow domain at a specific point in time in the mold filling, or simulated mold filling, process.

One way to enhance resin flow to reduce or eliminate dry spots is to apply a vacuum to the mold prior to injecting the resin in the mold (also known as "passive vacuum"). However, there is always some residual air. Moreover, as the resin flashes into the cavity, it may release vapors. The trapped air and vapor are both referred to as "trapped air" in the subsequent discussions.

The trapped air hinders the resin flow into the unfilled region. Pressure in the unfilled region increases as more resin flows into that region, thereby decreasing the difference between the feed pressure and the pressure in the unfilled region. Since this pressure acts as the driving force for the resin flow, the resin stops flowing into the unfilled region when the pressure in the unfilled region becomes equal to the feed pressure. Under these circumstances, the cured part will contain a dry spot.

Alternatively or additionally, a vacuum can be applied while the resin is injected in the mold (also known as "active vacuum"). However, even during this process, some of the residual air may get entrapped in the preform. Application of an active vacuum also often results in considerable wastage of resin.

Often a combination of passive and active vacuums are utilized to minimize the occurrence of dry spots while limiting resin wastage. First, a vacuum is pulled in the mold, the vent ports are closed, and the resin is injected under passive vacuum. The residual air in the mold is pushed into the unfilled region and pressure in the unfilled region increases. The difference between the feed pressure and the pressure in the unfilled region, which acts as the driving force to the resin flow, decreases, resulting in a decreasing resin flow rate. When the flow rate becomes negligible, the vents are opened to apply an active vacuum. Some of the trapped air then escapes through the vents. More resin is then injected under passive vacuum. This sequence of alternating between closing the vent ports and opening the vent ports is known as a "pack and bleed" sequence. A pack and bleed sequence is typically repeated until no more air comes out of the open vents. It will be appreciated by those skilled in the art that a simulation of the LCM process must therefore include the capability of handling changes in pressure within the cavity which occur as a result of the introduction of pack and bleed sequences.

Another factor which may affect the formation of dry spots, and, therefore, must be accounted for in any simulation, is racetracking. Racetracking is the phenomenon in which the resin flows faster through the higher permeability regions of the preform, such as edges and bends, than through the middle of the undeformed preform. A consequence of racetracking is that the higher permeability regions are filled before the lower permeability regions, which may result in air entrapment and, possibly, dry spots in the finished part.

Other factors which alone, or in combination, affect the formation of dry spots include the part geometry, the location of the feed and vent ports, and the feed conditions.

Mold flow simulations have been recognized as a potentially valuable tool in predicting resin flow rates and patterns. However, a more thorough understanding of the process of air entrapment and dry spot formation, and in particular air entrapment during mold filling in RTM, is desirable in order to optimize mold design, reduce developmental time and costs, and increase the efficiency of the molding process.

SUMMARY OF THE INVENTION

One object of the present invention is to provide a method and apparatus for predicting the occurrence of incipient dry spots in a particular RTM molding application.

Another object of the present invention is to provide a system which simulates the RTM mold filling process for a particular part geometry to provide pressure and velocity data of the resin at selected points in time during the filling of the mold.

Another object of the present invention is to provide a method and apparatus for simulating the mold filling process for a particular part geometry which allows the operator to vary process parameters, including the open/closed condition of the vent ports, to develop the pack and bleed sequence which results in an optimal filling process.

It is yet another object of the present invention to provide a system and method for predicting the occurrence of incipient dry spots in a RTM mold filling process, including means for altering process parameters such as the feed pressure, resin velocity, and vent port locations, to reduce dry spot formation and achieve an optimal molding process.

It is yet another object of the present invention to provide a system and method for designing an RTM mold which includes logic for predicting the occurrence of incipient dry spots in the mold filling process.

It is yet another object of the present invention to provide a system and method for developing a pack and bleed sequence which provides the shortest filling time with an acceptable limit of dry spots in the finished product.

It is yet another object of the present invention to provide a system and method for simulating an RTM mold filling process including means for modifying selected mold design and filling parameters, including the location of vent ports, the optimal pack and bleed sequence, and resin feed pressure, through a simulation which may be iterated and/or interrupted by an operator during operation to dynamically develop the desired parameters.

It is yet another object of the present invention to provide a system and method for designing an RTM mold which includes logic for simulating the mold filling process, as well as logic for iteration and/or interruption of the simulation process in order to vary selected mold filling design and process parameters to efficiently yield an optimal mold design.

It is yet another object of the present invention to provide a plastic molding system which includes logic for simulating the mold filling process, logic for iterating and/or interrupting the simulation to vary selected process parameters, logic for determining acceptable process parameters, and communication means for transmitting control signals based upon the developed parameters to the control for an RTM molding system to control the mold filling process.

In carrying out the above and other objects, the system of this invention includes a computer having at least one processor, memory suitably connected to the processor, input means, display means, and logic for simulating the injection of resin into a mold cavity containing a preform based upon mold cavity design parameters, mold filling process parameters, physical property parameters, and system processing parameters, and identifying the current state of selected mold filling conditions at selected points in time during the mold filling process.

The system includes logic for identifying incipient dry spots, and preferably includes means for interrupting the operation of the program at selected points to vary selected process parameters, including injection pressure and/or flow rate, as well as the open/closed condition of one or more vent ports.

The system logic also preferably includes logic for describing the flow domain of the resin (i.e., the shape of the mold cavity or the preform) as a finite element mesh including a plurality of nodes, and employing a control-volume finite element analysis based upon a preselected set of governing equations to determine the pressure distribution and the velocity at selected points in time during the filling process.

In one embodiment, the system also includes logic for dividing the nodes into three groups, including: (1) filled nodes, (2) unfilled-connected nodes which are contiguous with an open vent or another unfilled-connected node, and (3) unfilled-unconnected nodes which are not contiguous with an open vent or other unfilled-connected nodes, and determining the sets of contiguous unfilled-unconnected nodes, each set constituting an incipient dry spot.

The system may also include a graphic interface which allows the operator to provide all the necessary input data using conventional menu driven and/or command driven modes.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
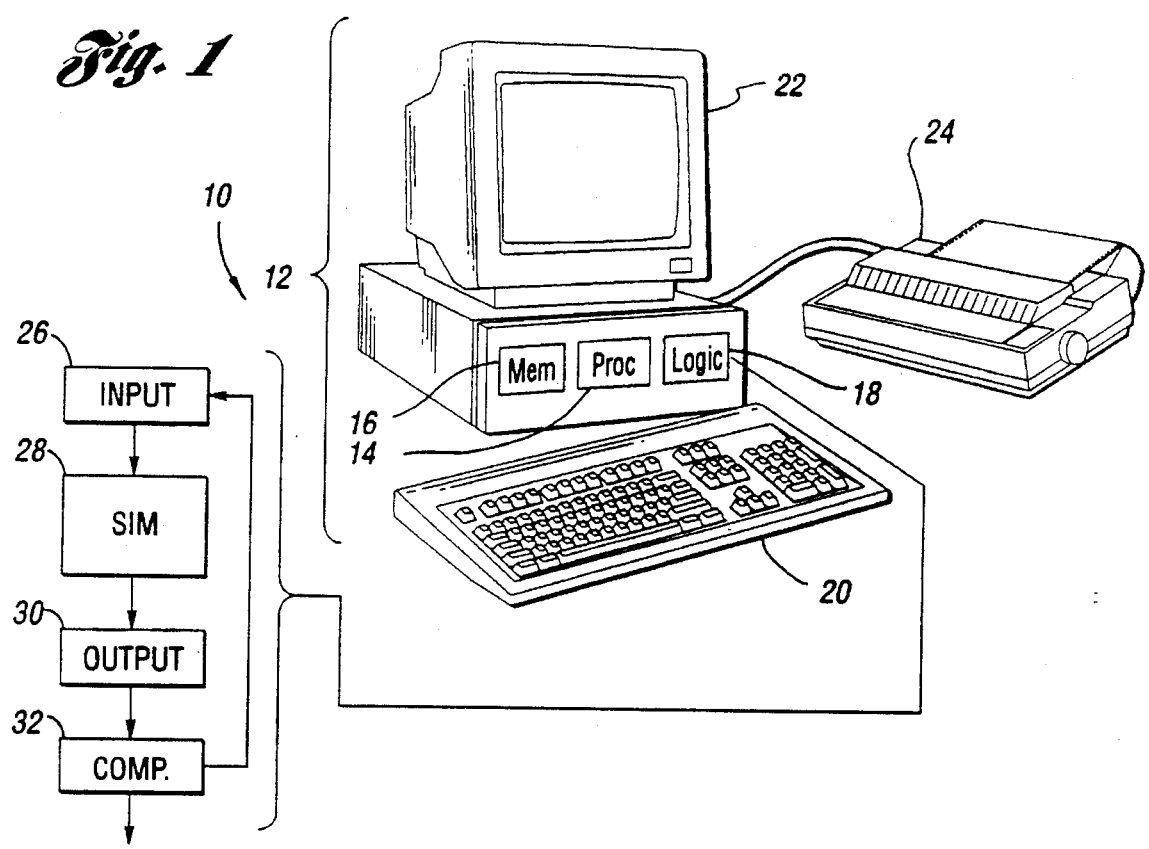
FIG. 1 is a block diagram of one embodiment of the system of the present invention.

Referring to FIG. 1, the system 10 of the present invention includes a conventional computer 12 having a processor 14, operably connected to memory 16, and suitable logic for accomplishing the data input, simulation, and data output functions further described herein. The system 10 also includes data input means 20 and a display 22. While the display 22 is depicted as a conventional CRT display, other data output equipment, such as conventional printers 24, may also be employed for obtaining the desired data output in human-readable form. Similarly, while a conventional keyboard is shown as the data input means 20, other conventional data input equipment, including a mouse, trackball, and/or light pen may be utilized to facilitate the data input by the operator. The system 10 also preferably includes one or more conventional data storage/retrieval devices, such as a magnetic disk hard drive, laser disk drive, or magnetic tape drive, for storing and retrieving data before, during, and after the simulation process.

In one embodiment, an IBM RX 6000 Model 520 computer, including a 19" IBM Model 6091 monitor, 64 megabytes of Random Access Memory (RAM), and an 800 megabyte hard disk drive are utilized for the hardware components of the system 10. In this embodiment, the operating system is an AIX Version 3.2.5, and the logic includes suitably programmed FORTRAN 77 routines for performing the simulation functions, and PATRAN™ and related PATRAN™ Command Language (PCL) subroutines which provide a graphic interface for entering the input data and rendering the results. The interface with PATRAN™ may be designed to operate in a menu-driven mode as well as in a command-driven mode without departing from the spirit of the present invention. PATRAN™ is available from PDA Engineering, of Costa Mesa, Calif.

It should be appreciated that, while a PATRAN™ interface is utilized in the above-described embodiment, other graphic interfaces may be utilized to generate the finite element mesh, facilitate the input of the finite element mesh data and other required data, provide a user-friendly interface for the operator while running the simulation, and facilitate the presentation of the data output by the simulation program, without departing from the spirit of the present invention. Similarly, the simulation logic may be programmed in other suitable languages, provided they perform the functions described herein.

The logic 18 facilitates the input function 26 which accepts the input variables required by the analysis program, or automatically selects suitable defaults for these variables, prior to initiation of the simulation, as well as during the simulation at preselected stopping points. The input variables are described in greater detail below, and include mold design parameters, physical property parameters, process parameters, and numerical parameters.

The logic 18 also performs the mold filling simulation 28 utilizing a finite element control-volume approach to solve a preselected set of governing equations to determine various process-related parameters. As further described hereinafter, the simulation logic develops resin flow front data, including the pressure, and location of a flow front, at discrete time steps during the filling process. The simulation logic 28 is capable of accounting for and racetracking, as well as identifying locations of gas entrapment as previously described.

The system may be operated in several different modes to generate output relating to specifically desired process parameters, including the mold fill time, the optimal pack and bleed sequence, the optimal feed conditions, and/or the optimal locations on the mold for the vent ports. If desired, incipient dry spots are identified and the operator can alter mold filling process parameters to reduce or eliminate the air entrapment. The incipient dry spot locations may be identified at preselected stopping points during the mold filling simulation. Once identified, the operator can modify mold filling parameters, such as opening vent gates, and continue the simulation until the next selected stopping point.

Thus, the logic 18 also performs a data output function 30. This data output function may include the display, either on the CRT display 22, a line printer 24, or other suitable display, of selected data at preselected stopping points during the mold filling simulation, as well as at completion of the simulation. The output data may include a summary of the mold filling status including such parameters as the present time, the total number of nodes filled, the feed pressure, the feed flow rate, the flow rate through open vents, and the number of dry spots. The output function 30 may also provide additional dry spot data such as the volume, pressure, resin flow rate into the dry spot, and a list of nodes in the dry spot for each dry spot in the preform. Additional node data may also be generated. This data may include the pressures, fill time, and fractions of the control-volume filled for each node. Similar element data, including the X, Y and Z components of the resin velocity in the global coordinate system for each element, may also be provided.

It is contemplated that the logic 18 may also perform a comparing function which determines whether the output from any mold filling simulation satisfies a set of predefined criteria to determine whether a particular mold design and/or process is acceptable for use in production.

It should be appreciated that, while the logic 18 of the present invention is in the form of suitably programmed computer software in one embodiment of the present invention, the logic 18 may take other forms, such as conventional firmware or hardware logic circuitry, or combinations of software, firmware, and hardware, without departing from the spirit of the present invention.

Once deemed acceptable, either by the operator, or by a compare function 32 in the logic 18, a set of mold filling process parameters may be recorded on storage memory in a suitable format for transfer and input to an RTM mold control. Alternatively, a direct communication link (see FIG. 2) may be employed to transfer selected process data directly to an RTM mold control for use in the molding process. Similarly, suitable CAD data including the optimal vent port locations determined by the logic 18 may be recorded on storage memory (or transferred via a hardwire link) to a CAD system for rendering a graphic display of the optimal design. Again, alternatively, the data could also be transferred directly to a machine tool control for direct use in designing the mold such as by determining the number and/or locations of the vent ports.

Figure 2:
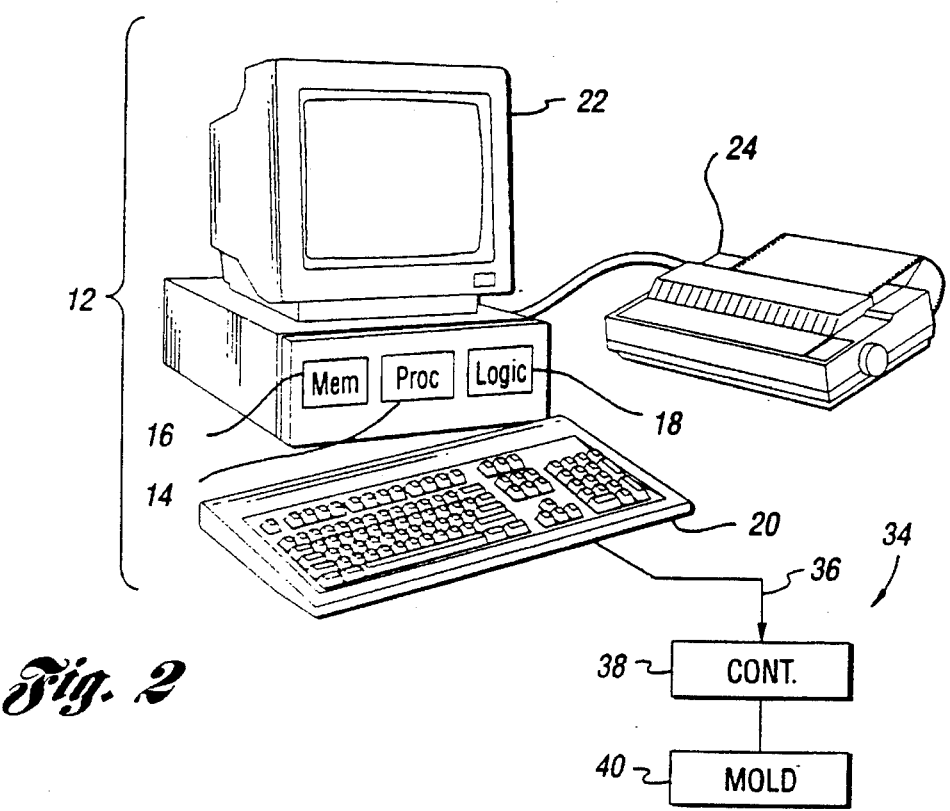
FIG. 2 is a block diagram of a second embodiment of the present invention.

Referring to FIG. 2, system 34 represents another embodiment of the present invention which includes substantially the same components 12–32 of system 10, as well as a communication link 36 to a conventional mold control 38 for direct input of process parameters into the control 38 for use in operating a mold 40 to produce liquid composite plastic parts directly using mold process parameters developed by the simulator 28.

Figure 3:
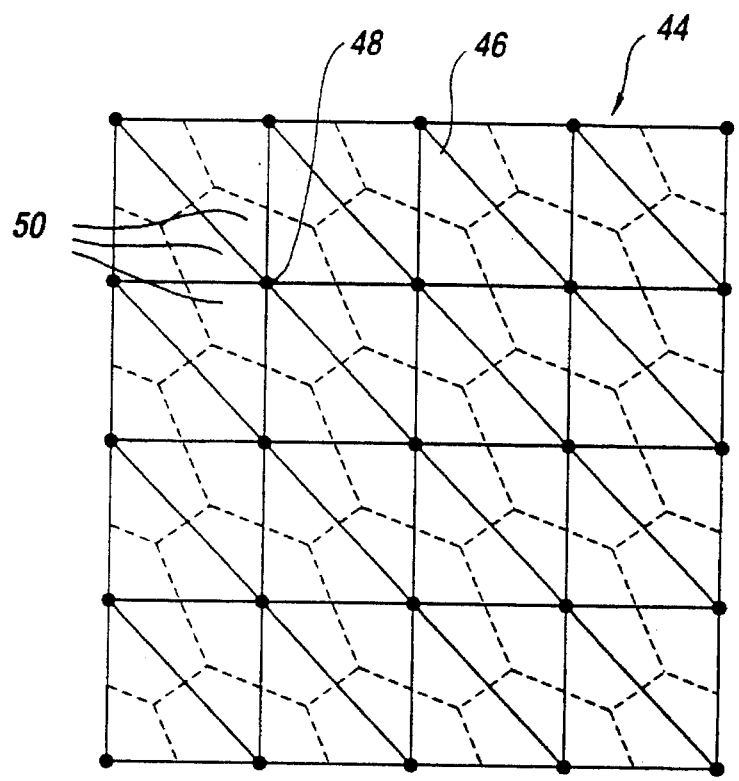
FIG. 3 is a diagram illustrating the finite element mesh which may be employed by the system, including nodes, elements, and control-volumes.

Referring now to FIG. 3, the system 10 utilizes a finite element mesh to describe the surface of the preform. As previously described, in one embodiment, the system utilizes a conventional PATRAN™ program to develop the finite element mesh. Other systems are available for performing this function and may, of course, be utilized in place of PATRAN™ without departing from the spirit of the present invention.

The mesh is divided into finite sections, triangular elements 46, bounded in the Figure by solid lines which interconnect the nodes 48 in the finite element mesh. Control-volumes 50, which surround each node 48, are also defined, and are graphically represented by the areas bounded by the solid lines and broken lines in FIG. 3. For example, a single element 52 is shown as being bounded by solid lines 53, 54, 55 which join nodes 56, 57, and 58. One of the control volumes associated with node 58 is defined by a portion of line 54, and lines 59, 61, and 53.

The Control-Volume Approach

In the standard finite element approach, the governing equations are solved using a variation method or a weighed residual method. Thus, the governing equations (also known as the conservation equations) are satisfied only in an approximate sense.

In the control-volume approach utilized herein, the governing (or the conservation) equations are balanced for each control-volume 50. When one quantity is transported out of a control-volume 50, the same quantity is transported into the adjacent control-volume(s). This approach is very conservative and is less sensitive to mesh size than the standard finite element approach.

Theoretical Basis of Simulation

During mold filling, heat transfer takes place between resin and the fiber mat, and resin and the cavity walls. The resin may cure if the temperature is sufficiently high. The composition and viscosity of the filling mixture change as the mold is being filled. Moreover, two phases (gas and liquid) besides the solid phase (mat and mold walls) coexist. Under certain mold design and/or mold filling process conditions, it may not be possible to displace all the gas from the mold, in which case the cured part will contain dry spots.

For a rigorous description of the mold filling process, one should take into account all the above-described effects. It has been found, however, that the following assumptions may be utilized to limit the complexities of the process, while at the same time allowing for a useful simulation:

(1) The resin flow is two dimensional in a direction generally parallel to the preform surface;

(2) The process is isothermal and the curing rate is low;

(3) There is negligible expansion or shrinkage of the resin during the mold filling;

(4) The fiber mat (or preform) is already pre-placed in the mold, is rigid, and does not deform during the flow;

(5) The resin velocities are low and the inertial effects are negligible;

(6) The effect of gravitational forces is negligible;

(7) Surface effects are negligible;

(8) Darcy's Law for flow through a porous medium may be used to relate pressure and flow rates; and (9) The resin permeability in the preform remains constant throughout the filling process.

As described above, in most RTM processes the part or cavity thickness is very small compared to the other dimensions and the flow can be considered parallel to the preform surface. When the surface effects are negligible, the resin thoroughly wets the fiber bundles. A direct consequence of assumptions (3) and (4) is that the resin-preform system can be considered incompressible.

If a cavity is divided into filled and unfilled regions, all the resin that flows into the cavity through feed ports or channels must leave through the flow front to the unfilled regions. The steady-state form of the equation of continuity can be solved along with Darcy's Law to give the pressure and velocity profiles in the filled region and at the flow front. Therefore, for the filled region $$\nabla \cdot v = 0 \tag{1}$$

The fluid velocity is related to the pressure gradient through Darcy's Law, $$v = -\frac{K}{\mu} \nabla P \tag{2}$$

Here v is the gradient operator, v is the velocity vector, K is the permeability tensor for anisotropic material, $\mu$ is the resin viscosity, and P is the resin pressure. The resin viscosity depends upon the resin temperature and the degree of cure.

In case the heat effects are significant, the above equations should be solved simultaneously with the equations of energy conservation and species mass balance:

$$\rho c_p \frac{\partial T}{\partial t} + \epsilon c_{pr} v \cdot \nabla = \nabla \cdot k \nabla T + \epsilon \Delta H \dot{m} \tag{3}$$

$$\frac{\partial \alpha}{\partial t} + v \cdot \nabla \alpha = \dot{m} \tag{4}$$

Here $c_P$ is the specific heat of the resin-filled preform, $c_{PR}$ is the specific heat of the resin, $\epsilon$ is the preform porosity, k is the conductivity tensor for the resin-filled preform, $\dot{m}$ is the rate of curing, $\Delta H$ is the heat of reaction, and $\alpha$ is the degree of cure. Equations 1–4, along with the kinetic expression for the curing rate and the equation describing the dependence of viscosity on the resin temperature and the degree of cure, are solved to simulate mold filling. As previously described, these equations are solved using a control-volume/finite element approach.

In order to solve these equations, the boundary conditions at the feed ports and at the flow front must be specified. At the feed ports, either the feed pressure or the feed flow rates are known. At the flow front, the pressure is equal to the pressure in the unfilled region. Equations 1 and 2, along with the boundary conditions, are solved to provide pressure and velocity distribution in the filled region and the velocity at the flow front.

Once the velocity at the flow front is determined, the time to fill the next node is calculated. The new position of the front is obtained when the next node is filled, and the corresponding time is calculated from the fluid velocity at the front. The filled region, unfilled region, and the flow front are adjusted to accommodate the newly filled node. The process of calculating pressure distribution in the filled region and moving the flow front is repeated until all the nodes are filled or the total flow rate falls below a minimum value.

The Governing Equations

The net flow rate out of a control-volume is given as:

$$Q = \int_v \nabla \cdot v \, dV \tag{5}$$

Here, v is the velocity vector and V is the volume over which the above integral is evaluated. By using the divergence theorem, the integral over the volume in the above equation can be converted to the integral over the surface of the control-volume:

Here, S is the boundary surface of the control-volume 50 and ŝ is the unit vector perpendicular to $$Q = \int_s \hat{s} \cdot v \, dS \tag{6}$$

the surface. For incompressible fluid, the net flow rate is zero if the control-volume is already filled. For a control-volume that is being filled, the net flow rate is negative (into the control-volume). The velocity vector v is related to pressure through Darcy's law for porous medium.

$$v = -\frac{K}{\mu} \nabla P \quad (7)$$

Here, K is the permeability tensor for anisotropic material.

For two dimensional cases, flow is parallel to the preform surface (the elemental plane) and $\hat{s}$ can be considered as a unit vector perpendicular to the line (curve) enclosing the element surface. If $h_z$ is the element thickness, the Equations (19) and (20) can be rewritten as:

$$Q = \int_c h_z \hat{s} \begin{bmatrix} v_x \\ v_y \end{bmatrix} dL \quad (8)$$

$$\begin{bmatrix} v_x \\ v_y \end{bmatrix} = -\frac{1}{\mu} \begin{bmatrix} k_{xx} k_{xy} \\ k_{yx} k_{yy} \end{bmatrix} \begin{bmatrix} \partial P/\partial x \\ \partial P/\partial y \end{bmatrix} \quad (9)$$

Here, $v_x$ and $v_y$ denote the x and y components of the velocity. The above equations are the working equations for the resin transfer molding process subjected to the assumptions listed earlier.

The functional form of the solution within an element is described in terms of shape functions:

$$P = \sum_{i=1}^{3} P_i N_i \quad (10)$$

Here, $P_i$ is the pressure at the ith node and $N_i$ is the ith shape function for the element under consideration. The linear shape functions for triangular elements are given as:

$$N_i = \frac{1}{2A} [\alpha_i + \beta_i x + \gamma_i y] \quad (11)$$

where $$\alpha_i = x_j y_k - x_k y_j, i \neq j \neq k, \quad (12)$$

and i, j, and k permute in natural order $$\beta_i = y_j - y_k \quad (13)$$

$$\gamma_i = x_k - x_j \quad (14)$$

Here, A denotes the element area. Note that x and y are the axes of the local coordinate system and that the xy plane in the local coordinate system is parallel to the elemental plane.

It should be noted that finite element models usually involve two systems of coordinates, a global coordinate system and a local coordinate system. The global coordinate system is the frame of reference for the entire continuum. All the points are located in space using a global coordinate system. The local coordinate system is attached to an element in such a way that its orientation with respect to the element is independent of the element orientation with respect to the global coordinate system. It typically, however, has the same units as the global coordinate system.

In RTM simulations, another useful coordinate system is the material coordinate system (denoted herein by x*, y*, z*. x* and y* represent two principle flow directions in the plane of the fiber mat, and z* is perpendicular to the plane of the mat. The fiber permeabilities are usually measured along these axes. Since most of the finite element computations are done in the local coordinate systems, the permeability tensor in the material coordinate system is transformed to the permeability tensors in the local coordinate systems.

For two-dimensional flow, the fiber mat is parallel to the elemental plane and there is no flow in the direction perpendicular to the elemental plane. The permeabilities along the x and y axes of the local coordinate system are given by the following coordinate transformation:

$$\begin{bmatrix} k_{xx} k_{xy} \\ k_{yx} k_{yy} \end{bmatrix} = \begin{bmatrix} \cos\omega & -\sin\omega \\ \sin\omega & \cos\omega \end{bmatrix} \begin{bmatrix} k_x^* & \\ & k_y^* \end{bmatrix} \begin{bmatrix} \cos\omega & \sin\omega \\ -\sin\omega & \cos\omega \end{bmatrix} \quad (15)$$

Here, $\omega$ is the material angle defined as the angle between the x* axis of the fiber mat and the x axis of the local coordinate system. This material angle is specified for each element.

Since the quantities such as pressure, fill time, and total flow rate in the simulation are independent of the coordinate system, any frame of reference with x and y axes on the elemental plane can be selected. In doing so, the local coordinate system follows the fiber mat as it is being stamped into a preform. The stamping process can be considered as a rotation of the fiber mat (or rotation of the normal to the fiber mat plane) at every location. The local coordinate system of an element is therefore obtained by rotating the z axis of the global coordinate system such that it is perpendicular to the elemental plane. If there is no excessive fiber reorientation in the mat, the material angle (the angle between the x* axis of the material coordinate system and the x axis of the local coordinate system) will be the same as the angle between the x* of the material coordinate system and the X axis of the global coordinate system. This choice of local coordinate system allows for specification of material angles with respect to the global coordinate system.

The following equation is used to transform global coordinates into local coordinates:

$$\begin{bmatrix} x \\ y \\ z \end{bmatrix} = \begin{bmatrix} \frac{n_x^2 n_z + n_y^2}{n_x^2 + n_y^2} & \frac{n_x n_y (n_z - 1)}{n_x^2 + n_y^2} & -n_x \\ \frac{n_x n_y (n_z - 1)}{n_x^2 + n_y^2} & \frac{n_x^2 + n_y^2 n_z}{n_x^2 + n_y^2} & -n_y \\ n_x & n_y & n_z \end{bmatrix} \begin{bmatrix} X \\ Y \\ Z \end{bmatrix} \quad (16)$$

Here, $n_x$, $n_y$ and $n_z$ are the components in the global coordinate system of the unit vector perpendicular to the elemental plane, X, Y and Z are the global coordinates of a point, and x, y, and z are the local coordinates of that point. As will be appreciated by those skilled in the art, the matrix operation of equation 16 is a conventional method for transforming the coordinates of one coordinate system into another coordinate system. Examples of this coordinate transformation are also illustrated in "Mold Filling Simulation in Molds With Pre-Placed Fiber Mats," W. B. Young et. al., Report to the National Science Foundation, Engineering Research Center for Net Shape Manufacturing, No. ERC/NSM-P-90-20, June, 1990, which is incorporated herein.

As previously described, to employ the control-volume based finite element scheme, each triangular element is divided into three sub-regions (or control-volumes) by the broken line segments connecting the centroid of the elements to the midpoints of each side of the triangle as shown in FIG. 3. Each node is associated with a control-volume which contains all the control-volume-segments surrounding the node. Each control-volume-segment consists of two segments of straight lines over which the line integral in Equation (4) is to be evaluated. Since linear shape functions are utilized for pressure, the velocity is constant within an element. If the thickness is also constant within an element, Equation (8) can be rewritten as follows:

$$Q = \sum_{i=1}^{m} h_z [L_{x1} + L_{x2} \, L_{y1} + L_{y2}] \begin{bmatrix} v_x \\ v_y \end{bmatrix} \quad (17)$$

Figure 4:
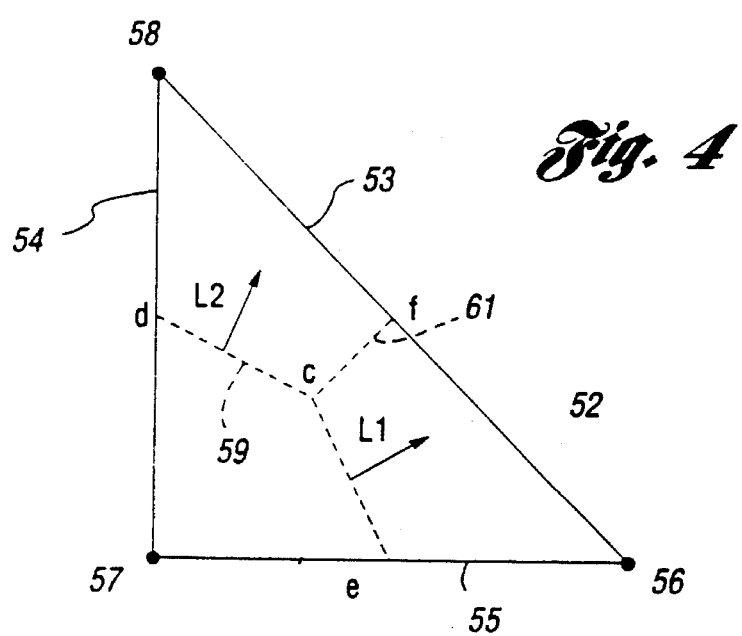
FIG. 4 is a diagram illustrating an element and the control-volume segments associated with the nodes defining that element.

Here, m is the number of control-volume-segments associated with a node, $L_{x1}$ and $L_{x2}$ are the x components, and $L_{y1}$ and $L_{y2}$ are the y components of the normal vector to the line segments 1 and 2. In FIG. 4, the normal vectors to the line segments are denoted by $L_1$ and $L_2$. These vectors are given as:

$$L_1 = [(y_c - y_2)\hat{i} - (x_c - x_2)\hat{j}]/2 \quad (18)$$

$$L_2 = [(y_c - y_1)\hat{i} - (x_c - x_1)\hat{j}]/2 \quad (19)$$

Here, $x_c = [x(1)+x(2)+x(3)]/3$ and $y_c = [x(1)+x(2)+x(3)]/3$ are the local coordinates of the center point. Note in FIG. 4 $\bar{c}3 = 2\bar{c}f$. Substituting Equations (9–14) in Equation (18), yields the following expression for the net flow rate out of a node:

$$Q = \sum_{i=1}^{m} [\phi_1 \phi_2 \phi_3] \begin{bmatrix} P_1 \\ P_2 \\ P_3 \end{bmatrix} \quad (20)$$

where, $$\begin{bmatrix} \phi_1 \\ \phi_2 \\ \phi_3 \end{bmatrix}^T = \frac{-h_z}{2A\mu} [L_{x1} + L_{x2} \, L_{y1} + L_{y2}] \begin{bmatrix} k_{xx} k_{xy} \\ k_{yx} k_{yy} \end{bmatrix} \begin{bmatrix} \beta_1 \beta_2 \beta_3 \\ \gamma_1 \gamma_2 \gamma_3 \end{bmatrix} \quad (21)$$

Above is the final form of the working equations.

At each iteration of the simulation, the status of a mode can be characterized as: (1) filled, (2) partially filled flow front nodes, and (3) unfilled nodes. The pressure at the flow front nodes and the unfilled nodes is developed by employing the algorithm described herein, taking into account the gas mass in the unfilled regions, the pressure gradient in the immediate surroundings of the unfilled region, and the status (open or closed) of the outlet ports. The pressures for the nodes in the filled region are found by solving Equation (20). The net flow rate for all the nodes in the filled region is zero except for the feed nodes.

The feed nodes are treated as source nodes, i.e., there is always a net flow out of the feed nodes. The feed rate is equal to the sum of the flow rates out of all the feed nodes:

$$Q_F = \sum_{J=1}^{N_F} \sum_{i=1}^{m} [\phi_1 \phi_2 \phi_3] \begin{bmatrix} P_1 \\ P_2 \\ P_3 \end{bmatrix} \quad (22)$$

Here, $N_F$ is the number of nodes in the feed. All the feed nodes are assumed to have the same pressure $P_F$. The above equation can be solved for the feed flow rate if the feed pressure is specified, or for the feed pressure if the feed flow rate is specified.

For a flow front node, there is a net flow into the node (-ve flow rate). Knowing the fraction of the control-volume filled and the flow rate into a flow front node, the time required to completely fill the node is calculated. Since a node cannot be overfilled, the minimum time to fill the next node is used as the time step. Next, the fraction filled of the control-volume for the flow front nodes are calculated. The lists of filled, unfilled, and the flow front nodes are adjusted accordingly. The open vent nodes act as sinks with unlimited capacities and the node pressures are always equal to open vent pressure.

Thus, the process of mold filling can be summarized as follows:

1) Solve the working equations for all filled nodes;
2) Calculate the net flow rate for each node and the minimum time to fill the next control-volume of a flow front node;
3) Calculate next position of the flow front by using the time step calculated in the previous step;
4) Recalculate the physical and chemical properties which depend upon time, pressure, velocity, or filling status of the element; and
5) Repeat steps 1–4 until all the nodes are filled, or the operator stops the simulation.

Figure 5:
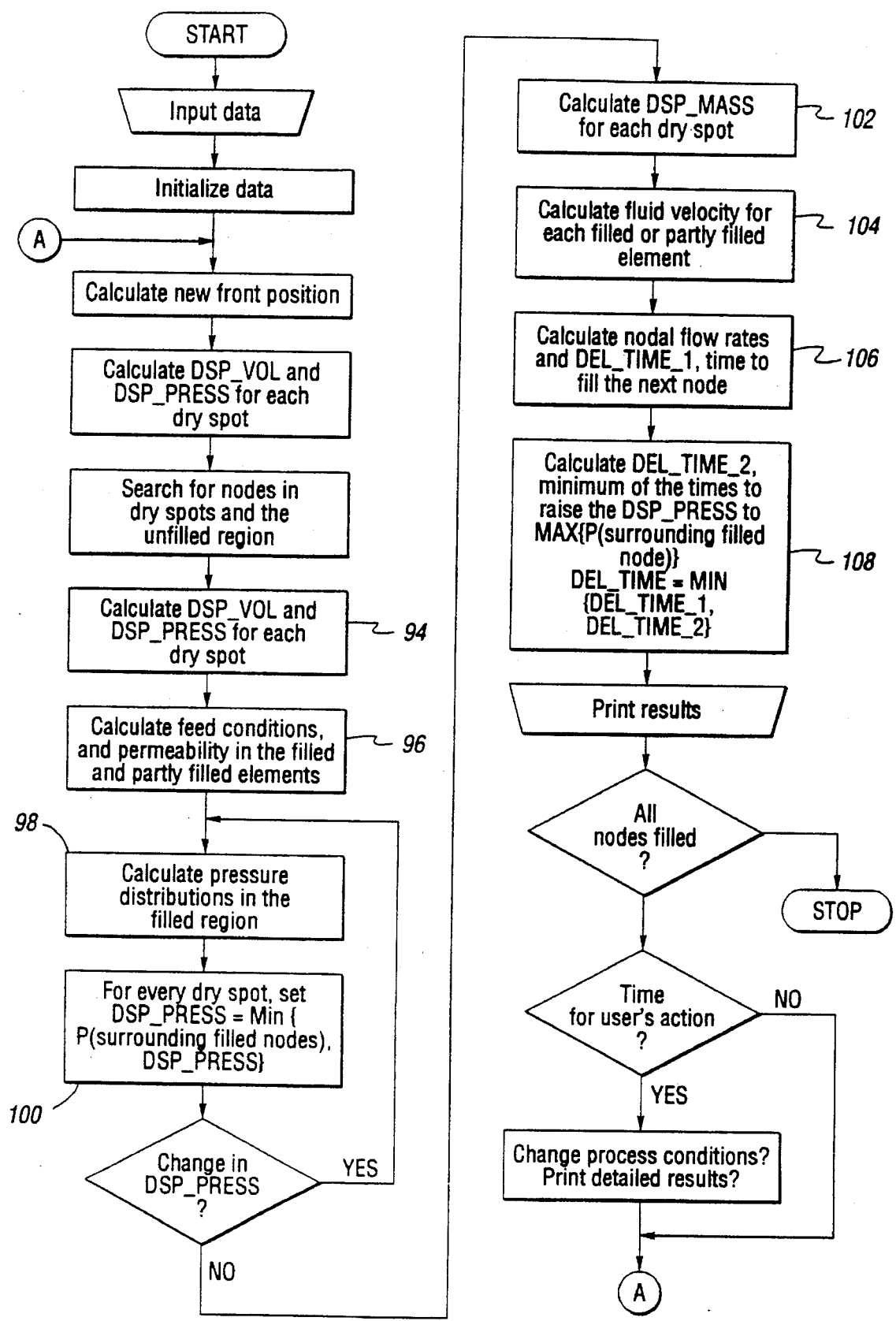
FIG. 5 is a flow chart illustrating the basic logic employed by the system.

The process is depicted in greater detail in FIG. 5, and will be further described hereinafter.

The Input Data

As previously discussed, the input variables required by the simulator can be divided into the following groups:
1) Design parameters;
2) Physical property parameters;
3) Process parameters; and
4) Numerical parameters.

Design Parameters

The design parameters are a function of the mold design only. The design parameters include the parameters for the part geometry and location of the feed and vent paths. In the embodiment described herein, the parameters used to describe the part geometry are the X, Y and Z coordinates of each node and the corner nodes of each element. The parameters which describe the location of a feed path are the identifier of the nodes in the feed path. There can be more than one feed path for a given part geometry. The parameters that describe the location of a vent path are the identifiers of the nodes in the vent path. Again, there can be more than one vent path for a given part geometry.

Before the design parameters can be specified, the part (the preform or the cavity) must be divided into finite, triangular elements. The finite element discretization may be accomplished by using PATRAN directives.

Physical Property Parameters

The physical property parameters include the thickness of the fiber material, the permeability parameters, the material angle, the porosity of the fiber mat, and the racetracking factor. These parameters can be adjusted for the individual manufacturing of the parts. However, these parameters cannot be changed after the preform has been placed in the mold and the mold has been clamped.

All the physical property parameters have to be specified for each finite element. However, their values can be different for different elements. The thickness of the fiber material is usually the same as the cavity thickness, except when foam pieces or other materials are inserted in the preform. The permeability parameters include the coefficients in the following expression for calculating the permeabilities:

$$k_i = (a_{1i} + a_{2i}x\epsilon)v_i + a_{3i}\frac{\epsilon^3}{(1-\epsilon)2} + a_{4i} \times \exp(a_{5i}x\epsilon) + a_{6i} \quad (23)$$

Here, $k_i$ is the permeability along the i axis of the material coordinate system, $v_i$ is the absolute value of the velocity along the i axis, and $\epsilon$ is the porosity of the fiber mat. The x* and y* axes of the material coordinate system are along the two principal flow directions in the plane of the fiber mat and the z* axis is perpendicular to the plane.

The permeability parameters, (the "a" coefficients in the above equation), are associated with each fiber material and are usually stored in a database. Each element is then assigned a material-id which refers to the fiber material in that element.

The material angle is the angle between the x* axis of the material coordinate system and x axis of the global coordinate system.

The porosity of the fiber mat is set at a value proportional to, and preferably equal to, the void fraction in the fiber mat.

The racetracking factor is the ratio of the permeability of the fiber mat in an element to the permeability of the undeformed fiber mat. During preforming, the fiber mat can be deformed which may cause a change in the permeability. Also, there can be a fiber-free region along the preform edges which can contribute toward a higher permeability in that region.

Process Parameters

The process parameters include the resin viscosity, the initial pressure, the pressure or the flow rate for each feed, the vent pressure, and the open/close status of each vent. It should be noted that in the preferred embodiment, these parameters can be changed while the resin is being injected into the mold. In order to effectively simulate the molding of the part, these important molding process parameters should be taken into account.

The resin viscosity is a function of the resin chemistry and the resin temperature. During the injection, we assume that the resin chemistry and the resin temperature, and therefore the resin viscosity, remain constant.

The initial pressure is the pressure in the cavity before the resin is injected into the cavity.

The feed conditions for each feed path can be one of the two types: a specified feed pressure or a specified feed flow rate. The feed type, the feed value at time zero, and the feed ramp rate must also be specified for each feed path. During the execution of the analysis program, the feed value is increased according to the ramp rate. For example, if the feed pressure at time zero is 2.0E5 Pa and the ramp rate is 1.0E3 Pa/second, then the feed pressure after 100 seconds will be 3.0E5 Pa. Moreover, the type of the feed conditions and the feed ramp rate can be changed during the execution of the analysis program.

The vent pressure is the pressure assigned to each node in a vent path whenever that vent is open.

The open/close status of the vents at the beginning of the resin injection is described by the parameter "filling mode". The filling mode can be 0, 1, or 2. When the filling mode is 0, the system does not take air entrapment into account. It assumes that the pressure in the unfilled region remains equal to the initial pressure. The vent pressure is irrelevant, but must be specified. When the filling mode is 1, the analysis program takes into account the air entrapment. All the vent paths are initially open and pressure in the mold cavity is equal to the vent pressure. The initial pressure is irrelevant in this case, but must be specified. When the filling mode is 2, the analysis program takes into account the air entrapment and all the vent paths are initially closed. At the beginning of the mold filling, pressure in the mold cavity is equal to the initial pressure.

During the execution of the program, one can change the open/close status of any vent.

Numerical Parameters

The numerical parameters control the solution of the governing equations. They include the convergence tolerance, maximum number of iterations for solving the system of algebraic equations, and the minimum dry spot volume.

The convergence tolerance should have a value between 0–1. When the tolerance is low, the results are more accurate, but more iterations are needed to converge to the solution. If the solution does not converge in the given number of iterations, the analysis program stops after writing an appropriate message on the screen.

An incipient dry spot is considered to have disappeared if its volume decreases below the minimum dry spot volume.

The Output Data

The data generated by the system can be divided into the following groups:

1) Summary of the mold filling status;

2) Dry spot data;

3) Node data; and

4) Element data.

Summary of the Mold Filling Status

The summary mold filling status data includes the following parameters:

a) present time, b) total number of nodes filled, c) feed pressure, d) feed flow rate, e) flow rate through open vents, and f) the number of dry spots.

This summary data is generated after completing the computations for each time step. In the preferred embodiment, this summary data is also displayed on the screen for each time step.

The dry spot data includes the volume, pressure, resin flow rate into the dry spot, and a list of nodes in the dry spot, for each dry spot in the preform. This data is generated only on demand by selecting stopping times during the simulation. It may be displayed on the screen, and written to a data file at these preselected times.

The node data is a graphic representation of the pressure, fill time, and fractions of the control volume filled, for each node at a particular selected point in the mold filling simulation. This data is also generated only when requested by the operator. In one embodiment, the file is formatted in PATRAN neutral format, and can be directly read by the PATRAN interface for post-processing.

The element data includes the X, Y and Z components of the resin velocity in the global coordinate system for each element. As with the node data, this information is graphic and may be written to a data file in PATRAN neutral format so that it can be directly read and post-processed by the PATRAN interface.

Thus, the system of the present invention includes logic for identifying the existence and location of incipient dry spots and tracking the change or disappearance in those incipient dry spots during the process. In the flow charts of FIGS. 5 and 6, respectively, the algorithms are displayed for identifying the incipient dry spots, and for the mold filling operation which incorporates incipient dry spot identification and evolution in the mold filling simulation process.

As previously described, the simulation is based on the front advancement scheme. It is assumed that the pressure distribution, flow rates, and the gas mass in the incipient dry spots remain constant during a time interval and their values are used to find the new position of the front. After the new position of the front has been calculated, the governing equations are solved to calculate new pressure distribution. The gas is allowed to escape from an incipient dry spot if its pressure is greater than the minimum of the resin pressures in the immediate surroundings.

As previously discussed, the whole preform is divided into triangular elements and the control-volume/finite element method is used to solve the governing equations. The outlet or the vent nodes can be opened or closed any time during the mold filling. The open vent nodes are treated like sinks of infinite capacities and the node pressures are always equal to the vent pressure. When the vent nodes are closed, they behave like other interior nodes, i.e., their resin capacities are equal to their control volumes and the node pressures are determined by solving Equations (1) and (2).

All the nodes, including the vent nodes, are divided into three groups, filled nodes, unfilled-connected nodes and unfilled-unconnected nodes. The filled nodes are the ones which are completely filled, i.e. fraction of the control-volume filled is one. The unfilled-unconnected nodes are the ones which are not completely filled and are connected to the open vent nodes either directly or through other unfilled-connected nodes. The unfilled-unconnected nodes are the ones which are not completely filled and are blocked from the open vent nodes by the filled nodes.

The unfilled-unconnected nodes may consist of one or more sub-regions, or so-called incipient dry spots, which are separated from each other by filled nodes. Nodes in an incipient dry spot form a subset of the unfilled-unconnected nodes and every unfilled-unconnected node is a part of an incipient dry spot. In order to trace the dynamics of various incipient dry spots, we assign dry spot names or "IDs" to every unfilled node. The dry spot id of an unfilled-unconnected node is the number of the dry spot to which it belongs. All the unfilled-connected nodes are assigned a dry spot id of zero.

Figure 6:
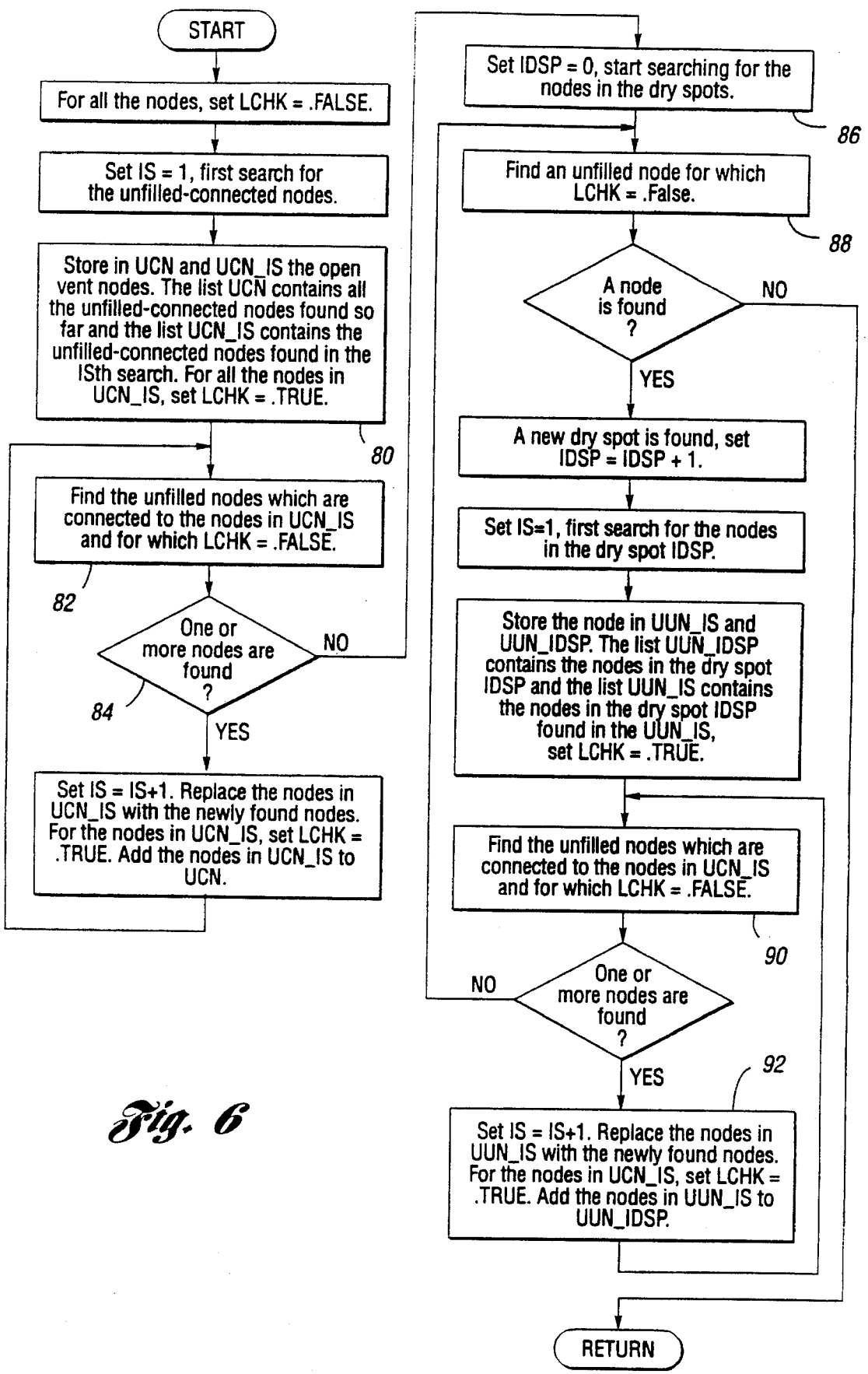
FIG. 6 is a flow chart illustrating the logic for identifying the incipient dry spots.

FIG. 6 is a flow chart illustrating the algorithm for identifying the incipient dry spots. The characterization of each of the nodes (as described above) and the identification of incipient dry spots is the most important task in the simulation of dry spot formation.

First, the subroutine variables are initialized, then a list of unfilled-connected nodes is made (at 80). To do so, the system starts from the open vent nodes and employs a front tracking method. The open vent nodes are always unfilled-connected nodes and make the initial set of front nodes. The system then searches (at 82) for all the unfilled nodes which are connected to the front nodes. These nodes form the second set of front nodes. The process is repeated until the set of front nodes is a null set at which point (84) we have a complete list of unfilled-connected nodes. All these nodes are assigned zero as the dry spot id (at 86) and the system begins searching for the unfilled-unconnected nodes.

The unfilled nodes which are not unfilled-connected are unfilled-unconnected nodes. The system begins (at 88) by finding an unfilled-unconnected node which has not yet been flagged (i.e., LCHK is false). If an unfilled-unconnected node is found, it becomes the first node in the newly formed incipient dry spot. In the subsequent discussion, this node is referred to as node UU1. The node UU1 must be a part of a dry spot which is named as DS1. A front tracking scheme is employed to create a list of nodes in the dry spot DS1. The node UU1 makes the initial set of front nodes. The unfilled nodes connected to the front nodes make the next set of front node. The process is repeated (at 90 and 92) until the set of front nodes is a null set, at which point we have a complete list of nodes in the dry spot DS1. The search for another dry spot then begins (at 88) by searching for another unfilled-unconnected node for which LCHK is false (i.e., an unfilled-unconnected node which is not included in an already identified dry spot). If another such node is found, the front tracking scheme is again employed to create a list of nodes connected to the node in this new dry spot. Once all the unconnected-unfilled nodes have been identified and associated with a dry spot (i.e., LCHK=true for all unfilled-unconnected nodes), the system has developed a complete list of the incipient dry spots and the constituting nodes.

Returning now to FIG. 5, the system then determines, at 94,the volume and pressure for each incipient dry spot. The volume of an incipient dry spot is equal to the sum of the unfilled control volumes of all the nodes in the incipient dry spot. The pressure in the incipient dry spot is equal to the pressure of nodes in the incipient dry spot. All the nodes in an incipient dry spot have the same pressure. However, different incipient dry spots may be at different pressures. The pressures of the unfilled-connected nodes are always equal to the vent pressure.

The pressure at the unfilled nodes and at the open vent nodes provide the one set of boundary conditions for equations (1) and (2). The feed flow rate, or the feed pressure, provides the other set of boundary conditions. The feed values at the present time are calculated from the feed values from the previous time step and the ramp rate (at 96). The physical properties for all the partly filled and the completely filled elements are evaluated as well.

The governing equations are solved (at 98) to determine the pressures at the filled nodes. It should be noted that the escape of air, in the form of small bubbles, from an incipient dry spot occurs if the dry spot pressure is greater than the minimum of the pressures at the filled nodes in the immediate surroundings of the incipient dry spot. The incipient dry spot pressure and the pressures at the nodes in the incipient dry spot are therefore set (at 100) to be equal to the minimum of the pressures at the filled nodes in the immediate surroundings of the incipient dry spot.

The adjustments (at 100) in incipient dry spot pressure change the boundary conditions for Equations (1) and (2). If such changes have occurred, these equations are solved again, at 98, with the new boundary pressure conditions. The process of solving the governing equations and adjusting the incipient dry spot pressure is repeated until the incipient dry spot pressure is not greater than the minimum of the pressures at the filled nodes in the immediate surroundings of the incipient dry spot. Note that the governing equations have to be re-solved only when the incipient dry spot pressure is greater than the minimum of the pressures at the filled nodes in immediate surroundings of the incipient dry spot and some gas escapes out of the incipient dry spot.

After the governing equations have been solved such that no further adjustment in the incipient dry spot pressures are needed, the dry spot pressures, as well as the volumes, and mass of the gas in the dry spots is then determined at 102 using the ideal gas law. It should be noted that the node pressures, the node flow rates, and mass of air in the incipient dry spots remain constant during the front advancement.

Once the pressure distribution in the preform is known, Equation (2) can also be solved to determine, at 104, the velocity in the filled and partly filled elements and, at 106, the net flow rate of the resin into the control volumes of the nodes. The net flow rate will be greater than zero only for the front nodes and will be zero for all other nodes. At 106, the time, DEL TIME1, required to fill the next node is calculated.

The next step (at 108) is to determine the time interval, DEL TIME2, which is the minimum of the time required to raise the incipient dry spot pressures to the maximums of the pressures at the filled nodes in the immediate surroundings of the incipient dry spots. The pressure of an incipient dry spot cannot be greater than the maximum of the filled node pressures in the immediate surroundings of the incipient dry spot. Knowing the time intervals and the resin flow rates at the front nodes, the fraction filled of control-volumes of all the front nodes are calculated. This provides the new position of the front and the database for the filled nodes, unfilled nodes, and the front nodes are adjusted accordingly at 110.

During the front advancement, the mass of the air in the incipient dry spot remains constant but its volume decreases. The new volume of an incipient dry spot is determined (at 112) from the unfilled fractions of the control volumes of all the nodes in the incipient dry spot. The incipient dry spot pressure is calculated using the ideal gas law. The incipient dry spot pressure is assigned to all the nodes in the incipient dry spot. Next, the pressure distribution in the preform is calculated.

The process is thus calculating nodal and dry spot variables for a given front position and advancing the front. This process is repeated until all the nodes are filled or the user chooses to stop the program.

As previously described, the system allows the user to open or close any of the vent ports at preselected stopping points in the simulation. When the vent ports are opened, the pressure associated with any unfilled connected nodes is set to the open vent pressure, and the associated parameters for the filled nodes, unfilled nodes, and the front nodes are adjusted accordingly.

The above-described algorithm thus takes into account all of the following phenomena that may take place during the course of mold filling:

1) the formation of a new incipient dry spot;
2) air escaping from an incipient dry spot;
3) the disappearance of an incipient dry spot when a vent is opened; and
4) the split of an incipient dry spot into more than one incipient dry spot.

It should be noted that two or more incipient dry spots are not allowed to coalesce in the simulation, since it has been observed that the front at an incipient dry spot moves only into the dry spot. In other words, once some part of the preform is filled, it cannot be unfilled. While slight movements of the vent side of the front away from the dry spot (toward the vent) occurs when the dry spot pressure is significantly and suddenly reduced by opening the vent, this movement is negligible compared to the movement of the feed side of the front into the incipient dry spot, and may be ignored.

An implicit assumption is that the air bubbles always find their way to an open vent after they leave an incipient dry spot. While this assumption may not be true in all the cases, air bubble movements through a filled region are not tracked, and it is assumed that the operator keeps the vents open for a sufficient time to allow all bubbles to reach open vents.

MODES OF OPERATION

The system, through the use and processing of the output data, can be run in various modes for the following purposes:

1) Determination of the mold fill time;
2) Determination of the best pack and bleed sequence;
3) Determination of the best feed conditions; and
4) Determination of the best locations for the vent ports.

Determination Of The Fill Time

This mode of use of the system mimics the flow of resin inside the mold during the actual injection. In this mode, the user specifies the location of the feed and vent ports, the feed conditions (i.e., the resin feed velocity or pressure), and the pack and bleed sequence. The system determines the flow front positions at various times until all the nodes are filled, or until the operator chooses to terminate the simulation.

Determination of the Best Pack and Bleed Sequence

In this mode, the system is utilized to determine the best pack and bleed sequence given certain target criteria. For example, the system could generate the optimal pack and bleed sequence for generating the least amount of dry spots. Alternatively, the system could generate the optimal pack and bleed sequence for minimum resin wastage.

The formation of small voids or air pockets (microvoids) between the filaments in the fiber mat preform depends upon the resin velocity at the front. The resin velocity at the front should not be less than an optimum value. Therefore, to minimize the formation of microvoids, resin should be packed into the preform until the velocity at a dry spot front decreases below the optimum value, at which time bleeding should commence.

Figure 7:
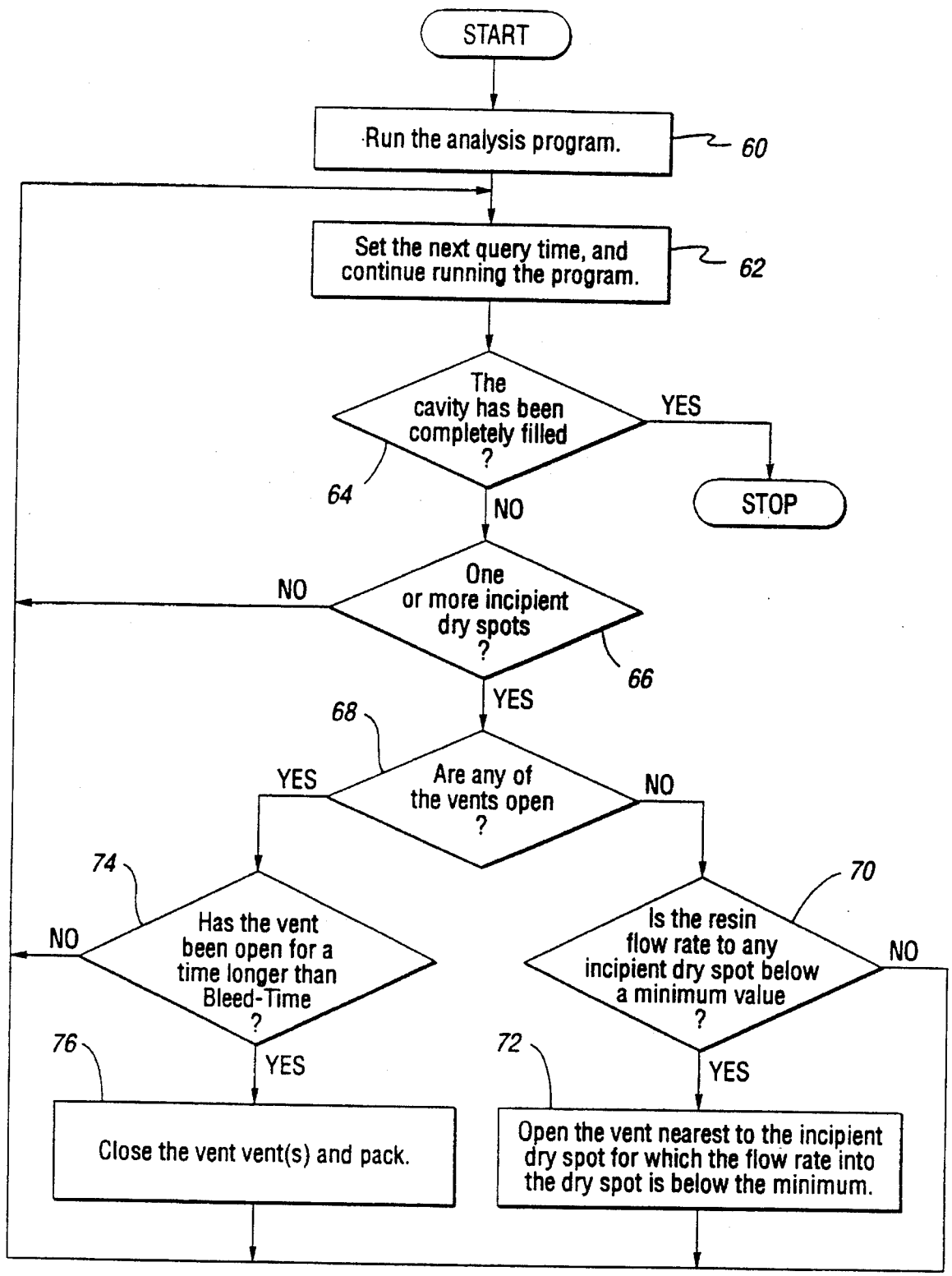
FIG. 7 is a flow chart illustrating the logic for determining an optimal pack and bleed sequence.

FIG. 7 illustrates the flow chart for this mode of use. In this mode, the user must provide the location of the feed and vent ports, and the feed conditions. The simulation is begun, at 60. A query time (i.e., a stopping point) is selected at 62, and the program continues to run until that point. The simulation stops at 64, when the cavity has been completely filled. If the cavity is not completely filled by the selected stopping time, the system identifies any incipient dry spots (at 66). If there are no dry spots, the next query time is selected and the system resumes operation (at 62). If any incipient dry spots were discovered, the system determines, as 68, whether any of the vents is currently open. If no vents are open, the system determines, at 70, whether the resin flow rate to any incipient dry spot is below a preset minimum value. If it is not, the next query time is set and the system resumes at 62.

If the resin flow rate has dropped below a minimum value at any dry spot, the vent nearest that incipient dry spot is open, at 72, and the simulation continues.

If the system determined that one or more of the vents were opened at 68, the system would then check to determine whether any open vent is open for a time greater than the preset maximum bleed time. If any of the vents have been open for a period longer than the preselected maximum, at 74, the system closes those vents, at 76 to begin a packing sequence, and continues. If none of the vents have been open for a period longer than the preselected maximum bleed time, the system continues.

The system continues in operation until the cavity is completely filled, resulting in a mold filling process which may include one or more packing and/or bleeding sequences. It will be appreciated if no incipient dry spots are discovered, the process will continue unabated until the mold fills. It is only upon the determination of incipient dry spots that the vents may be opened or closed to initiate bleeding or packing sequences, respectively, in order to eliminate the incipient dry spots.

Determination of the Best Feed Conditions

Figure 8:
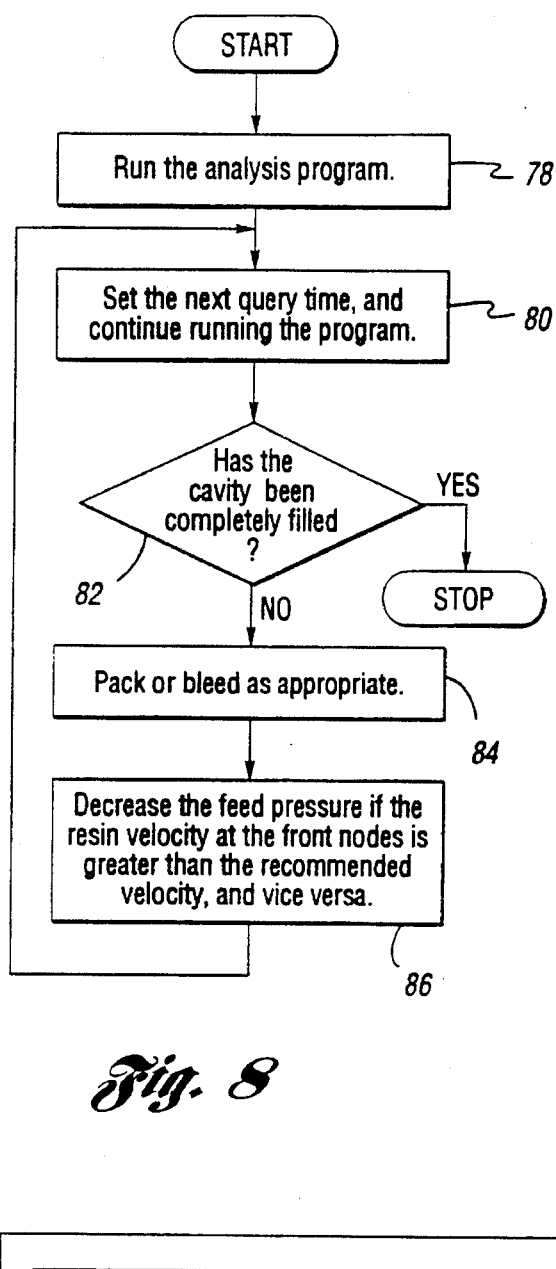
FIG. 8 is a flow chart illustrating the logic for determining optimal feed pressures.

The flow chart illustrating this mode of operation is shown in FIG. 8. In this mode, the system finds the feed pressure as a function of time such that the resin velocity at the flow front is approximately equal to the resin velocity which will give the least amount of microvoids.

In this mode, the operator specifies the location of the feed and vent ports and the recommended flow front velocity. The system begins the simulation, at 78, and the next query time (i.e. stopping point) is set at 80. At the preset stopping point, the system determines, at 82, whether the mold has been completely filled. If it has, the simulation is complete. If the cavity is not filled, the system then determines, at 84, whether a preset pack or bleed sequence should be initiated. The system then determines, at 86, whether the front velocity is greater, by a preselected amount, than the recommended velocity. If so, the feed pressure is decreased by a preselected increment. Similarly, the feed pressure is determined to be less by a preselected amount than the recommended velocity, the feed pressure is increased by a preselected increment. Otherwise, the feed pressure is left the same.

After this operation (at 86), the next query time is set, and the program continues (at 80), until the cavity has been completely filled.

Determination of the Best Locations for the Vent Ports

Figure 9:
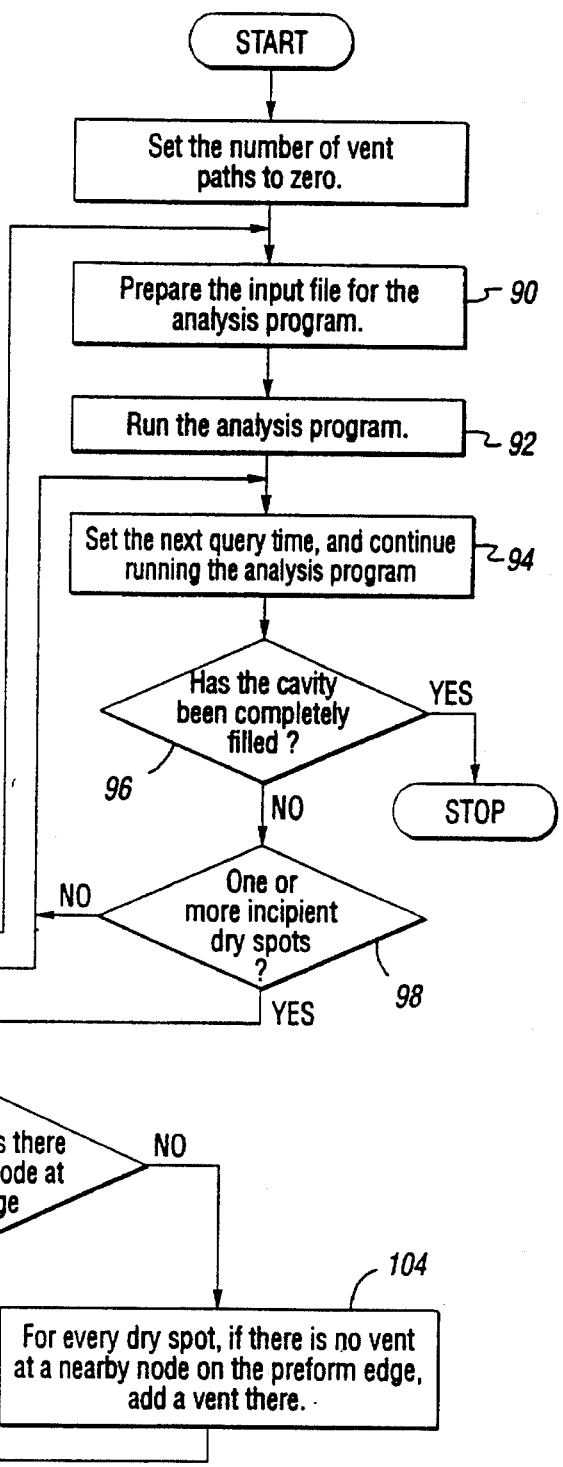
FIG. 9 is a flow chart illustrating the logic for determining optimal locations for the vent ports.

This mode of operation is illustrated in FIG. 9. In this mode, initially no vents are specified. The other process parameters, including the feed conditions, are initialized at 90. The system begins the simulation, at 92, and the next query time (i.e., stopping point) is set at 94. At the next query time, the system determines, at 96, whether the mold has been completely filled. If it has, the simulation is complete.

If the mold is not completely filled, the system then determines, at 98, the existence and location of any incipient dry spots. If no incipient dry spots are found, the next query time is set and the system continues at 94.

If any incipient dry spots are found, the system determines, for each incipient dry spot, if there is a vent at a nearby edge node (at 100). If there is a vent, the system determines, at 102, whether a predefined pack or bleed sequence should be initiated.

If there is no vent at an edge node near each incipient dry spot, the system adds a vent, at 104, at a nearby edge node for each such dry spot. If a vent is added, the simulation is stopped and a new simulation is initiated, at 90, this time with the installed vent(s). This process is repeated until the vents have been installed at all appropriate locations and all the nodes are filled.

FIGS. 10–16 illustrate output from two exemplary simulations performed by the system of the present invention. In both cases, the part geometry was "H" shaped, as shown in each of FIGS. 10, 11 and 13–15. The mold 200 had linear feed ports (paths) 202,204 at the bottom of the left and right sections of the mold 200. The mold 200 was provided with only one vent port (port) 206 located at the top of the left section of the mold 200.

The resin permeability in the preform was 1.0 E-9 m$^2$, and racetracking was neglected. The resin viscosity was 3.0 E-2 Pa-s. The initial pressure in the mold cavity and the vent pressure were 1.0 E-5 Pa. The initial feed pressure was 2.0 E-5 Pa. The feed pressure was increased at a ramp rate of 2.0 E-3 Pa/s for 400 seconds, after which the feed ramp rate was set to 0.

Figure 10:
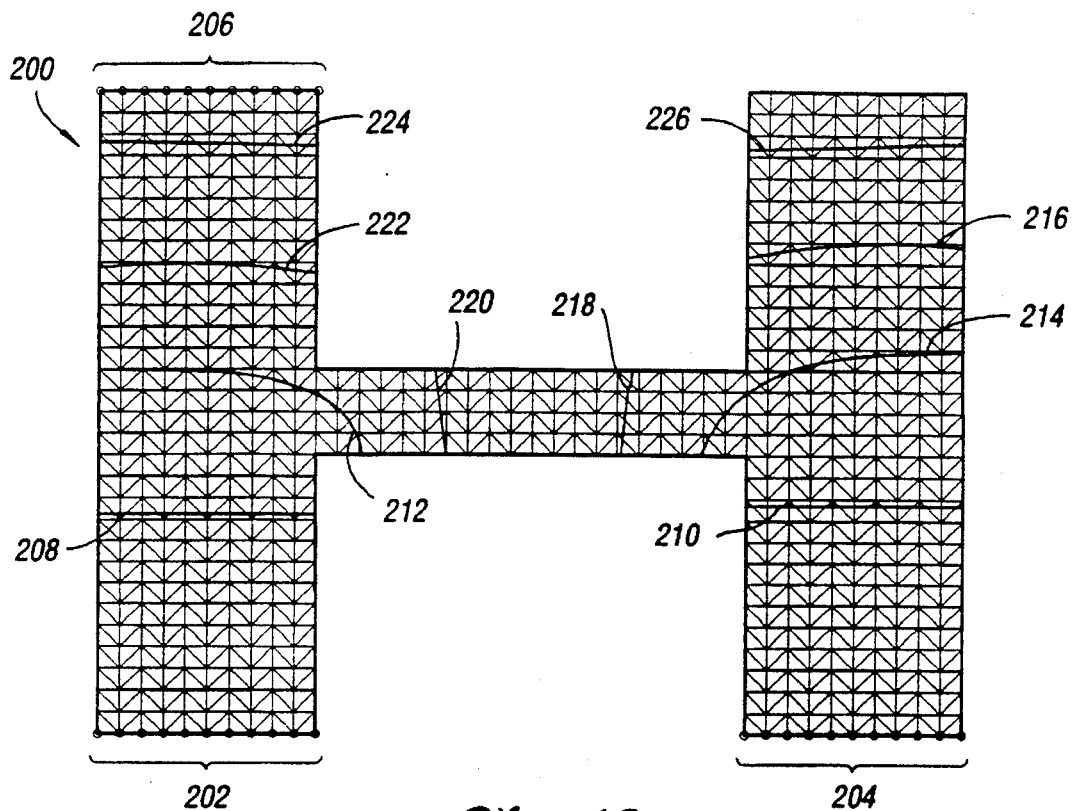
FIG. 10 is a diagram illustrating an exemplary mold including predicted flow fronts in a simulation when air entrapment is not taken into account.

In the first simulation, air entrapment was not taken into account, and the mold cavity filled in 220 seconds. The flow front positions at various times are shown in FIG. 10. In particular, the fronts at 208,210 existed at 50 seconds. The next front at 212,214 existed at 100 seconds. The next front at 216–222 existed at 150 seconds. The last front, indicated at 224,226 was measured at 200 seconds, and the mold filled completely in 220 seconds.

Figure 11:
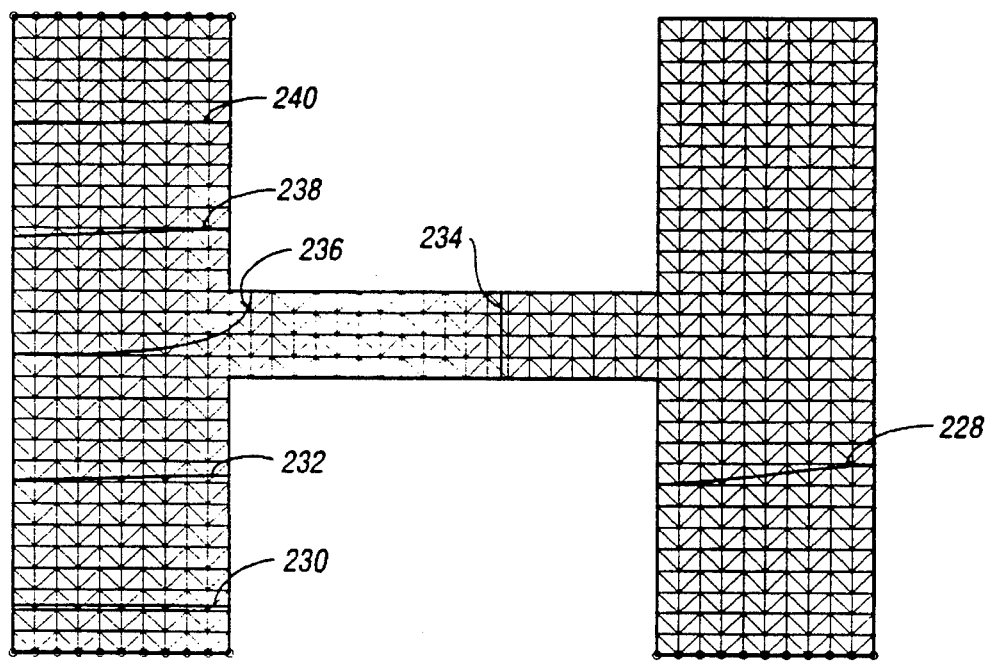
FIG. 11 is a diagram of the simulation of FIG. 10 illustrating the predicted pressure distribution at the end of the mold filling.

FIG. 11 illustrates the predicted pressure distribution at the end of the first mold filling simulation. At 220 seconds, the feed pressure was 6.5 E-5 Pa and the vent pressure was 1.0 E-5 Pa. The pressures at 228,230 was 6.0 E$^-$5 Pa. At 232,234, the pressure was 5.0 E-5 Pa. At 236, the pressure was 4.0 E-5 Pa. At 238, the pressure was 3.0 E-5 Pa, and at 240 the pressure was 2.0 E-5 Pa. It should be noted that the mold is completely filled and there is no flow into the top portion of the right section. Hence, the pressure gradient is 0 in that region.

When the system does not take air entrapment into account, it assumes that the pressure in the unfilled region is always equal to the initial pressure. Such simulations may work well if the vents are always open and the feed and vent ports are located such that the air displaced by the resin always finds its way to an open vent. However, in real RTM processes, the vents may be closed initially to reduce the resin wastage. Also, a pack and bleed sequence may be employed. Under these circumstances, the trapped air pressure is usually higher than the initial pressure. Since the difference between the feed pressure and the pressure in the unfilled region provides the driving force for the resin flow, simulations which do not take air entrapment into account predict shorter than actual mold filling times.

In addition to the mold filling times, it is also important to know not only the locations of the incipient dry spots, but also the number of times a pack and bleed cycle should be applied in order to expel the trapped air.

Figure 12:
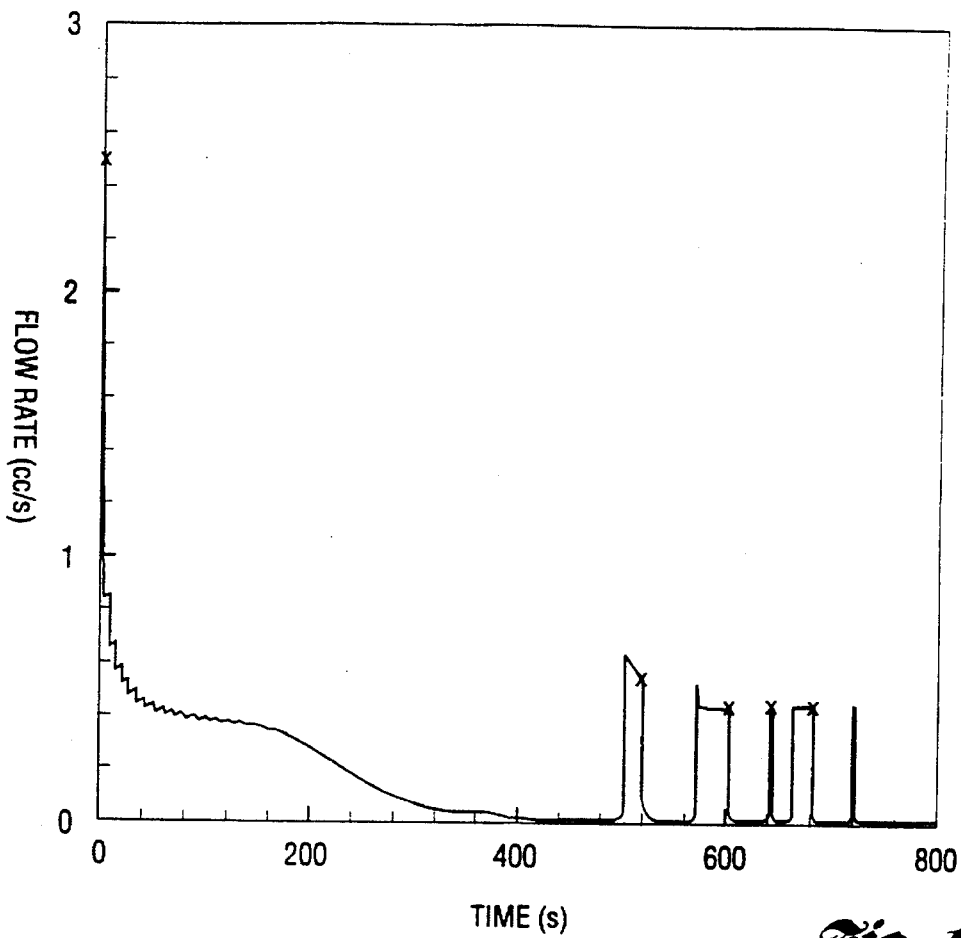
FIG. 12 is a graph of the feed flow rate as a function of time when a prescribed pack and bleed sequence is employed.

In the second simulation, the pack and bleed sequence shown in FIG. 12 was imposed during the mold filling simulation. In the Figure, an X indicates when the vent was closed, and a circle indicates when the vent was opened. The continuous line illustrates the feed flow rate in cubic centimeters per second. The part geometry, the resin feed pressure, the resin viscosity, the initial and vent pressures, and the resin permeability in the preform were the same as those of the first simulation described above.

Figure 13:
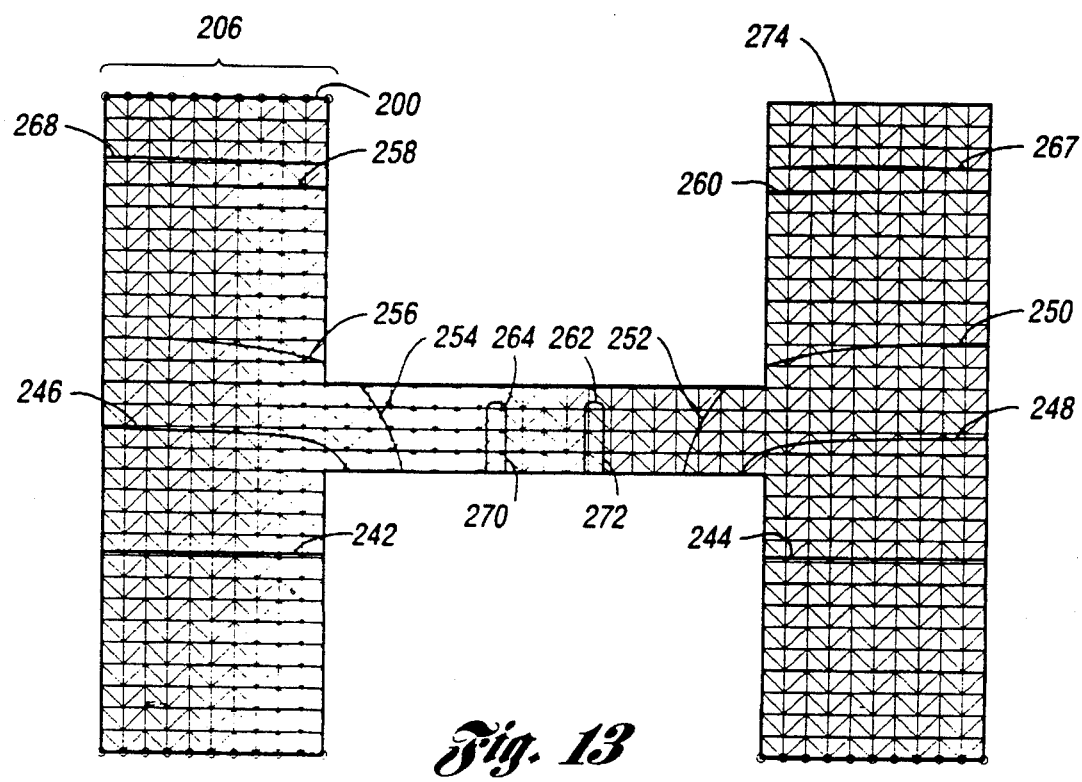
FIG. 13 is a diagram of an exemplary mold for a simulation including predicted flow fronts when the air entrapment is taken into account.

As illustrated in FIG. 13, the incipient dry spot configuration changed as the flow front advanced into the mold cavity 200. At the beginning of the mold filling, all the nodes were unfilled and the vent was closed. At this point, the entire mold cavity could be considered an incipient dry spot. The predicted flow front at 50 seconds is shown at 242,244. At 100 seconds, 246,248. At 150 seconds, 250–256. At time equal to 150 seconds, three incipient dry spots were identified. These dry spots, referred to as IDSP 1 (at the space between the resin flow front 256 and the vent 206). The second dry spot, referred to as IDSP 2 was located in the space between flow fronts 252 and 254. The third incipient dry spot, referred to as IDSP 3 was then located in the space between the front 250 and the top right section 274 of the mold 200. As the flow front advanced past 250–266, the incipient dry spots shrank and their pressure increased. At 300 seconds, 258,260, and at 500 seconds, 262,264.

It should be noted that, by comparing the flow fronts in FIG. 13 with those shown in FIG. 10, it is evident that the trapped air slowed down the resin flow into the cavity. Indeed, approximately 500 seconds after starting the mold filling, the pressure in the unfilled region approached the feed pressure and more resin could not be packed into the cavity. All of the mold cavity was then at the same pressure, 10.0 E-5 Pa.

Figure 14:
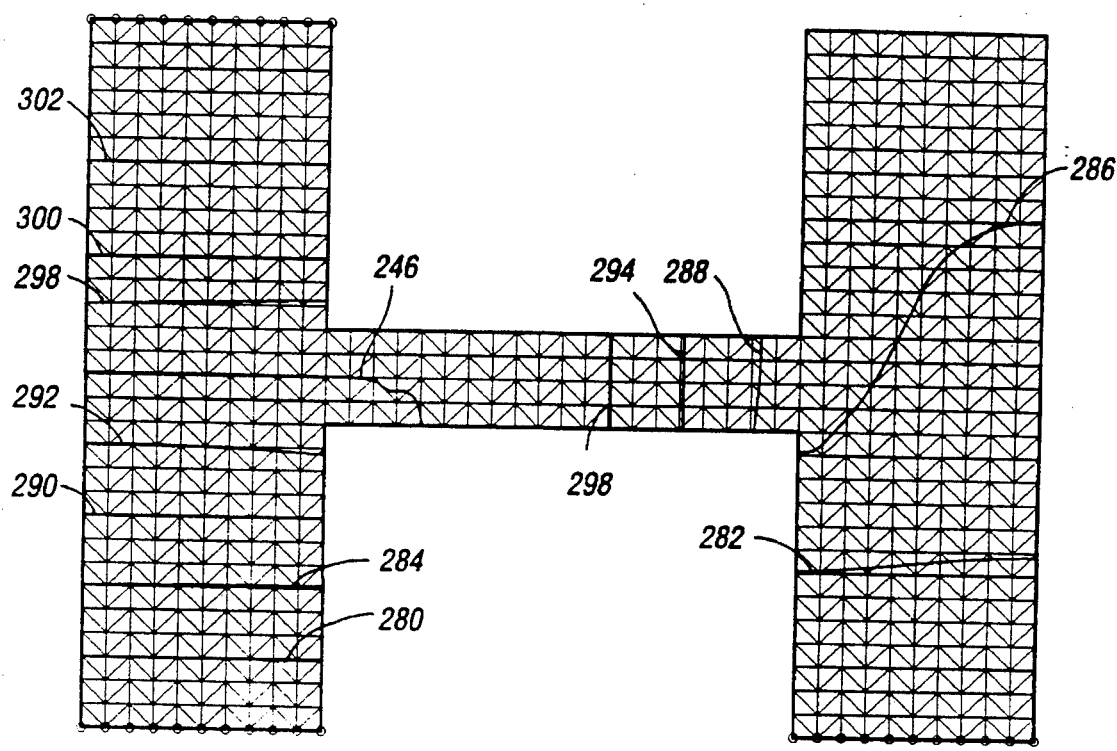
FIG. 14 is a diagram of the mold of FIG. 13 showing the predicted pressure distribution in the mold after opening the vent path at 500 seconds.

Since a mold with trapped air cannot be completely filled without allowing the trapped air to escape through an open vent, the vent port was opened at about 500 seconds. The pressure distribution immediately after opening the vent path (at 500 seconds) is illustrated in FIG. 14. The pressure at fronts 280 and 282 was predicted to be at 9.0 E-5 Pa. The pressures at 284,286 were predicted at 8.0 E-5 Pa. The pressures at 288,290 were predicted at 7.0 E-5 Pa. The pressures at 292,294 were predicted at 6.0 E-5 Pa. At 296,298, the pressures were predicted to be at 5.0 E-5 Pa. And, fronts 298, 300, and 302, the pressures were predicted at 4.0 E-5, 3.0 E-5 and 2.0 E-5 Pa, respectively.

Before opening the vent path, three incipient dry spots were identified, IDSP_1 at the top of the left section, IDSP_2 at the center of the middle section, and IDSP_3 at the top of the right section. The incipient dry spot IDSP_1 contained the vent path as well. When the vent path was opened, all the trapped air escaped. Moreover, IDSP_1 disappeared because the nodes which were once part of IDSP_1 are directly connected to the open vent and the air is not trapped at those nodes. Pressure at the nodes which were once part of IDSP_1 instantaneously decreased to the vent pressure. The incipient dry spots which contain the vent path are referred to as Type I incipient dry spots.

In this simulation, sufficient amounts of air escaped instantaneously to the open vent from the incipient dry spots IDSP_2 and IDSP_3 to make the pressures equal to the minimums of the pressures in their immediate surroundings. While the pressure in IDSP_2 was uniform, there was significant difference between the minimum and the maximum of the immediate surrounding pressures while the vent was still open. As shown in FIG. 10, the IDSP_2's volume decreased sharply after opening the vent path and IDSP_2 disappeared within 15 seconds (before the vent path was closed). The incipient dry spots for which there is a significant difference between the minimum and maximum of the immediate surrounding pressures during bleeding are called Type II incipient dry spots.

There was no significant difference between the minimum and maximum pressures at the immediate surroundings of IDSP_3. As can be seen in FIG. 10, there was no significant reduction in the IDSP_3's volume during bleeding. The reduction in volume during packing depended upon the ratio of the IDSP_3's pressure during bleeding and the feed pressure. In our simulation experiment, the feed pressure was 10.0 E-5 Pa and the IDSP_3's pressure during bleed was 9.2 E-5 Pa. There was approximately 9 percent reduction in the dry spot volume during one packing and bleed cycle. The incipient dry spots for which there is no significant difference between the minimum and maximum of the immediate surrounding pressures during bleeding are called Type III incipient dry spots.

In the simulation, the system assumed that air escaped instantaneously from the incipient dry spots as soon as the vent was opened. This assumption may be valid for incipient dry spots of Type I, which contain one or more closed vent paths, and the air can escape without trickling through the filled part of the preform. The assumption may also be valid for incipient dry spots of Types II and III if the porosity of the preform is sufficiently high. But, when the preform's porosity is low, the escape of air is a rate process. Since the system does not include in the analysis the dynamics of air momentum through the filled cavity or preform, the process engineer must bleed for times long enough to allow the air bubbles that escaped from the incipient dry spots to find their way to open vents, or else these bubbles will be trapped again and more dry spots or patches will appear. The dynamics of air bubbles through the filled cavity or preform depends mainly upon the preform porosity. The higher the porosity, the faster the trickling rate.

Categorization of the dry spots provides valuable information as to how to eliminate them. The user divides the incipient dry spots into three types. The Type I incipient dry spot contains the closed vent paths, and will disappear after the vent paths are opened. The Type II incipient dry spot is one for which there is a significant difference between the minimum and the maximum of the resin pressures in the immediate surroundings during the bleed step. The Type II dry spots fill during packing as well as bleeding and the trapped air escapes to the open vent throughout the duration of bleeding. Type III incipient dry spots are the ones for which there is no significant difference between the minimum and the maximum pressures in the immediate surroundings during the bleeding step. These dry spots are the most difficult to eliminate except, by adding vents to the mold at suitable locations.

While the best mode for carrying out the invention has been described in detail, those familiar with the art to which this invention relates will recognize various alternative designs and embodiments for practicing the invention as defined by the following claims.

What is claimed is:

1. A system for predicting the occurrence of incipient dry spots due to air entrapment for use with a plastic molding tool having a mold including a cavity into which resin is injected, the system comprising:

a computer having at least one processor, memory suitably connected to the processor, suitably connected input means, and suitably connected display means; and logic for (1) simulating the filling of the mold cavity by the resin based upon (a) mold cavity design, (b) mold filling process parameters, (c) physical property parameters, and (d) numerical processing parameters, and (2) identifying the current state of selected mold filling conditions, including identifying incipient dry spots, at a selected point in time during the mold filling process.

2. The system of claim 1 wherein the mold cavity design parameters include the locations of the feed and vent ports, and wherein the mold filling process parameters include whether the vent ports are open or closed.

3. The system of claim 2 wherein the logic includes logic for describing the shape of the mold cavity as a finite element mesh including a plurality of nodes, and the logic employs a control-volume finite element analysis utilizing a preselected set of governing equations to determine the pressure distribution and the velocity of the resin at the flow front of the resin at a selected point in time, determining the movement of the flow front of the resin for a selected time increment therefrom, and updating the location of the flow front in the mesh, and repeating the analysis until a preselected stopping point in the simulation of the mold filling process.

4. The system of claim 2 wherein the logic includes logic for dividing the nodes into three groups, including filled nodes, unfilled-connected nodes which are contiguous with a vent or another unfilled-connected node, and unfilled-unconnected nodes which are not contiguous with a vent or another unfilled-connected node, and determining the sets of contiguous unfilled-unconnected nodes, each set thereby constituting an incipient dry spot.

5. The system of claim 3 further including input means and associated logic for changing at least one of the mold filling process parameters at a preselected stopping point in the simulation of the mold filling process.

6. A method, implemented on a computer, of predicting the occurrence of incipient dry spots due to air entrapment for use with a plastic molding tool having a mold including a cavity into which resin is injected, including the following steps:

(a) describing the design of the mold cavity as a finite element mesh including a plurality of nodes;

(b) simulating the filling of the mold cavity by the resin based upon cavity design parameters, mold filling process parameters, physical property parameters, and numerical processing parameters; and (c) identifying the current state of selected mold filling conditions, including identifying incipient dry spots, at a selected point in time during the mold filling process.

7. A mold filling simulation system including:

a computer having at least one processor, memory suitably connected to the processor, suitably connected input means, and suitably connected display means;

logic for developing an input file including:

data describing the geometry of the mold cavity as a finite element mesh including a plurality of nodes, and the locations of the feed and vent ports, mold filling process parameters including feed port flow rates or pressures and whether the vent ports are open or closed, physical property data, and numerical processing parameters, logic for simulating the mold filling process defined by the input file to predict conditions in the mold at preselected time steps in the mold filling process, employing a control-volume finite element analysis utilizing a preselected set of governing equations to determine the pressure distribution and the velocity of the resin at the flow front of the resin at a selected point in time, determining the movement of the flow front of the resin for a selected time increment therefrom, updating the location of the flow front in the mesh, and repeating the analysis until a preselected stopping point in the simulation of the mold filling process; and input means and associated logic for changing at least one of the mold filling process parameters at a preselected stopping point in the simulation of the mold filling process.

8. The system of claim 7 wherein the logic for simulating the mold filling process includes logic for dividing the nodes into three groups, including filled nodes, unfilled-connected nodes which are contiguous with a vent or another unfilled-connected node, and unfilled-unconnected nodes which are not contiguous with a vent or another unfilled-connected node and determining the sets of contiguous unfilled-unconnected nodes, each set thereby constituting an incipient dry spot.

9. The system of claim 7 wherein the associated logic for changing at least one of the mold filling process parameters includes logic for adding at least one vent port at a selected location on the mold cavity.

10. In a liquid composite molding system including a mold cavity into which a preform is placed and into which a formable material is injected through at least one feed port, and further including at least one vent port, a control, the control comprising:

at least one processor, memory suitably connected to the processor, and logic for simulating the mold filling process to predict conditions in the mold at preselected time steps in the mold filling process, based upon the mold cavity design, preselected mold filling process parameters, physical property parameters, and numerical processing parameters, identifying the current state of selected mold filling conditions, at preselected points in time during the mold filling simulation, determining whether the selected process parameters satisfy a set of predefined criteria and, as a result of such determination, generating signals to control the operation of the mold to produce liquid composite plastic parts directly using mold process parameters developed as a result of the simulation.

11. A method, implemented on a computer, for predicting the occurrance of incipient dry spots due to air entrapment for use with a plastic molding tool having a mold including a cavity into which resin is injected, the method including at least the following steps:

(a) simulating the filling of the mold cavity by the resin based upon the mold cavity design, mold filling process parameters, physical property parameters, and numerical parameters; and (b) identifying the current state of selected mold filling conditions, including identifying incipient dry spots, at at least one selected point in time during the mold filling process.

12. The method of claim 11 including the following steps:

(c) describing the shape of the mold cavity as a finite element mesh including a plurality of nodes;

(d) employing a control volume finite element analysis utilizing a preselected set of governing equations to determine the pressure distribution and the velocity of the resin at the flow front of the resin at a selected point in time;

(e) determining the movement of the flow front of the resin for a selected time increment therefrom;

(f) updating the location of the flow front in the mesh; and (g) repeating the analysis until a preselected stopping point in the simulation.

13. The method of claim 12 wherein step (b) includes the following sub-steps:

(b)(1) dividing the nodes into three groups including filled nodes, unfilled-connected nodes which are contiguous with a vent or another unfilled-connected node, and unfilled-unconnected nodes which are not contiguous with a vent or another unfilled-connected node, and (b)(2) determining the sets of contiguous unfilled-unconnected nodes, each set thereby constituting an incipient dry spot.

14. The method of claim 11 further including the step of changing at least one of the mold filling process parameters at a preselected stopping point in the simulation of the mold filling process.

* * * * *